(12) United States Patent  (10) Patent No.: US 6,705,013 B2
Herndon et al. (45) Date of Patent: Mar. 16, 2004

(54) PART CREEP FOR SETTING BEARING GAP (75) Inventors: Troy M. Herndon, San Jose, CA (US);
Klaus D. Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 25 days.

(21) Appl. No.: 09/895,051

(22) Filed: Jun. 29, 2001

(65) Prior Publication Data
US 2002/0108250 A1 Aug. 15, 2002

Related U.S. Application Data (60) Provisional application No. 60/247,322, filed on Nov. 9, 2000.

(51) Int. Cl.[7] ............................................. B21D 53/10
(52) U.S. Cl. .................. 29/898.09; 29/898.07; 29/898.02
(58) Field of Search ..................... 29/898.02, 898.07, 29/898.09, 438

(56) References Cited

U.S. PATENT DOCUMENTS 6,298,570 B1 * 10/2001 Maughan et al.
6,341,422 B1 * 1/2002 O'Donnell

* cited by examiner

Primary Examiner—Gregory M. Vidovich
Assistant Examiner—Eric Compton
(74) Attorney, Agent, or Firm—Moser, Patterson & Sheridan LLP (57) ABSTRACT A method for setting one or more hydrodynamic bearing gaps in a disc drive spindle motor is provided. In one embodiment, a method setting one or more hydrodynamic bearing gaps in a disc drive spindle motor includes disposing a rotary member against one or more working surfaces such that substantially no gap exists therebetween and inducing creep between the rotary member and the working surfaces. The creep creates a bearing gap therebetween the rotary member and at least one of the working surfaces. The creep may be induced by thermally cycling the motor components or applying a force to a tool coupled to a member having at least one of the working surfaces disposed thereon.

20 Claims, 6 Drawing Sheets

PART CREEP FOR SETTING BEARING GAP

This application claims benefit of United States Provisional Application No. 60/247,322, entitled PART CREEP FOR SETTING BEARING GAP, filed Nov. 9, 2000 by Troy M. Herndon and Klaus D. Kloeppel, which is hereby incorporated by reference in its entirety.

FIELD OF THE INVENTION

The invention relates to the field of hydrodynamic bearing assemblies of the type that cooperates with high-speed spindle elements. More specifically, the invention relates to setting gaps in hydrodynamic bearing assemblies utilized in a disc drive system.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside a hub that supports the discs. One type of motor in common use is known as an in-hub or in-spindle motor. Such in-spindle motors typically have a spindle mounted by means of two ball or hydrodynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets cause the spindle to rotate, thereby rotating the disc and passing the information storage tracks beneath the head.

The use of hydrodynamic bearing assemblies in such drive systems has become preferred due to desirable reductions in drive size and noise generation as compared to conventional ball bearing drive systems. In hydrodynamic bearings, a lubricating fluid, such as oil or air, functions as the bearing surface between a stationary base or housing and a rotating spindle or hub. As the lubricating fluids require small gaps between the stationary and rotating members in order to provide the support, stiffness and lubricity required for proper bearing operation, conventional drive components and assemblies typically require tight tolerances and demand precision assembly methods. Such demanding tolerance and assembly control results in increased part and assembly costs along with an increased level of quality control to ensure proper drive operation.

Thus, the problem presented is to reliably set close bearing gaps without requiring excessive or burdensome part or manufacturing tolerances.

SUMMARY OF THE INVENTION

A method for setting one or more hydrodynamic bearing gaps in a disc drive spindle motor is provided. In one embodiment, a method for setting one or more hydrodynamic bearing gaps in a disc drive spindle motor includes disposing a rotary member against one or more working surfaces such that substantially no gap exists therebetween and inducing creep between the rotary member and the working surfaces. The creep creates a bearing gap therebetween the rotary member and at least one of working surfaces. The creep may be induced by thermally cycling the motor components or applying a force to a tool coupled to a member having at least one of the working surfaces disposed thereon.

The invention is useful in disc drive spindle motors having hydrodynamic bearings to set bearing gaps without tight assembly tolerances which would necessitate burdensome quality control procedures to confirm proper gap set and motor operation. Additionally, the invention allows the relaxation of tight component tolerances demanded in conventional designs resulting in lower component cost and reject rates.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numbers have been used, wherever possible, to designate identical elements that are common to the figures.

DETAILED DESCRIPTION OF THE PREFERRED EMBODIMENTS

Figure 1:
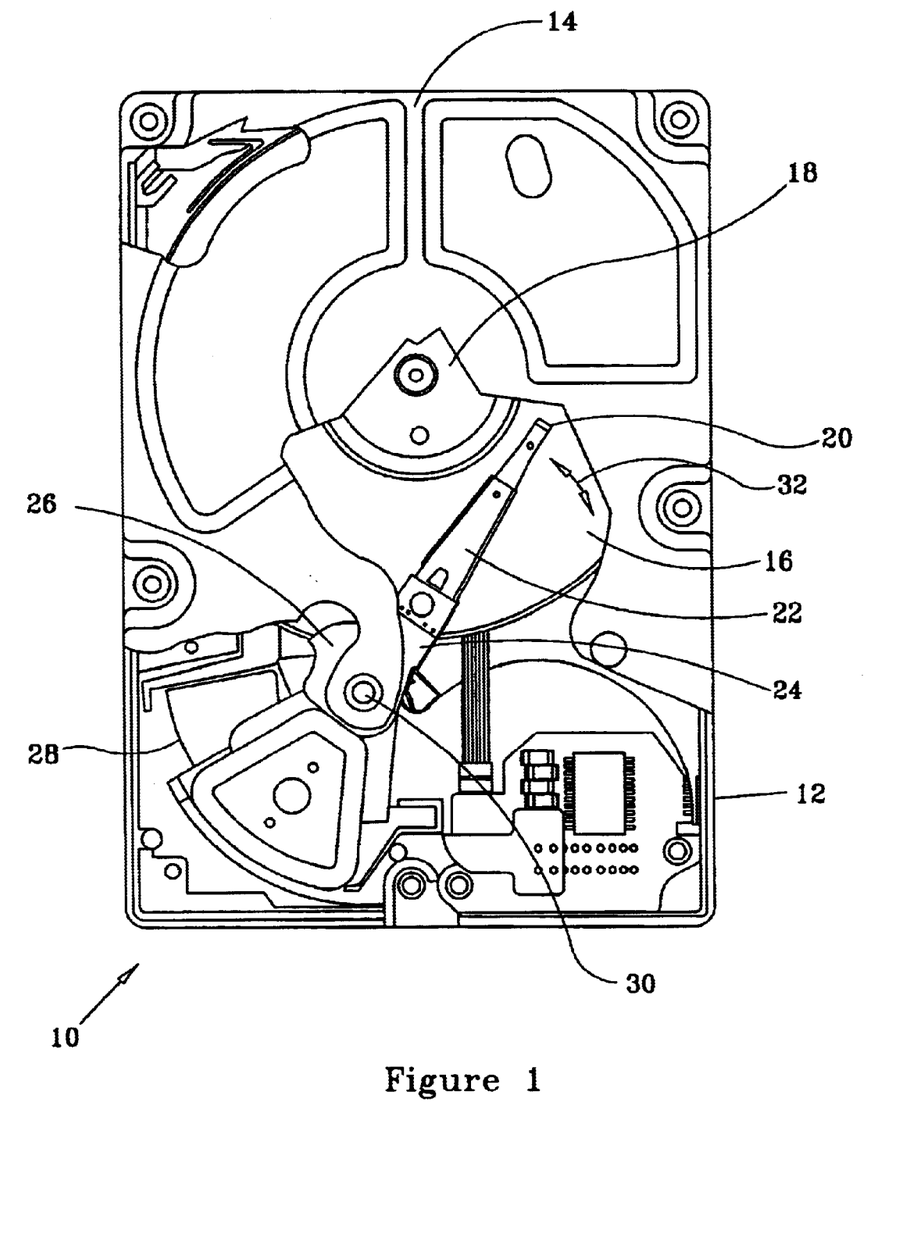
FIG. 1 is a top plan view of a disc drive data storage device, in accordance with the invention.

The invention comprises a spindle motor for a disc drive data storage device having hydrodynamic bearing gaps set by a creep procedure. FIG. 1 is a plan view of a typical disc drive 10 wherein the invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing. For example, disc drives have been manufactured using a vertical split between two housing members. In such drives, that portion of the housing half that connects to the lower end of the spindle motor is analogous to base 12, while the opposite side of the same housing member, that is connected to or adjacent the top of the spindle motor, is functionally the same as the top cover 14.

Disc drive 10 further includes a disc pack 16 that is mounted for rotation on a spindle motor (not shown) by a disc clamp 18. Disc pack 16 includes a plurality of individual discs that are mounted for co-rotation about a central axis. Each disc surface has an associated head 20 that is mounted to disc drive 10 for communicating with the disc surface. In the example shown in FIG. 1, heads 20 are supported by flexures 22 that are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the invention is also useful in disc drives having other types of actuators, such as linear actuators.

Figure 2:
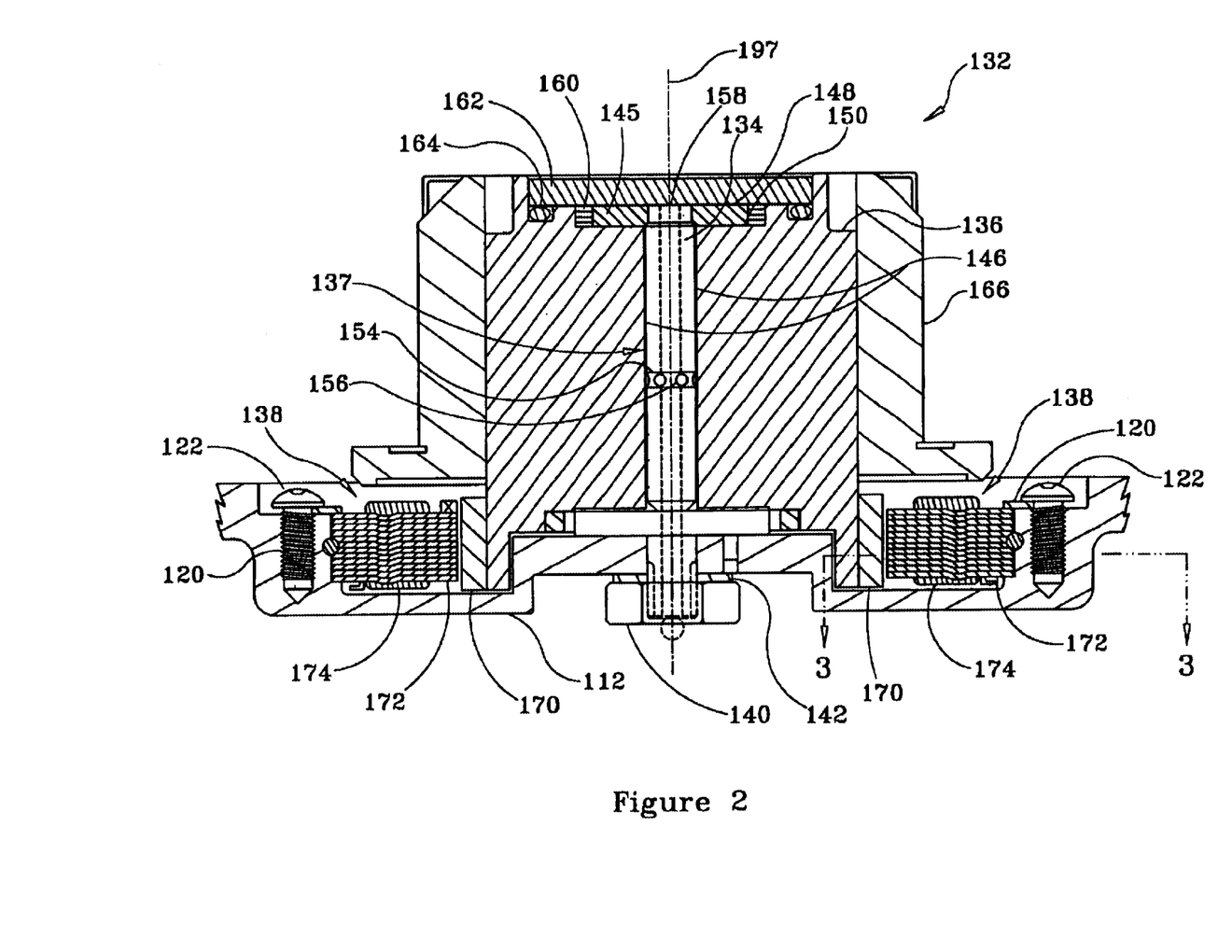
FIG. 2 is a sectional view of one embodiment of an isolated hydrodynamic bearing spindle motor in accordance with the invention.

FIG. 2 is a sectional view of a hydrodynamic bearing spindle motor 132 in accordance with the invention. Spindle motor 132 includes a stationary member (shaft) 134, a hub 136 and a stator 138. In the embodiment shown in FIG. 2, the shaft 134 is fixed and attached to base 112 through a nut 140 and a washer 142.

The hub 136 is supported by the shaft 134 through a hydrodynamic bearing 137 for rotation about shaft 134. The hub 136 includes a disc carrier member 166 that supports disc pack 16 (shown in FIG. 1) for rotation about shaft 134. The disc pack 16 is held on disc carrier member 166 by the disc clamp 18 (also shown in FIG. 1). A plurality of permanent magnets 170 are attached to the outer diameter of the hub 136, with the hub 136 and magnets 170 acting as a rotor for the spindle motor 132.

Figure 3:
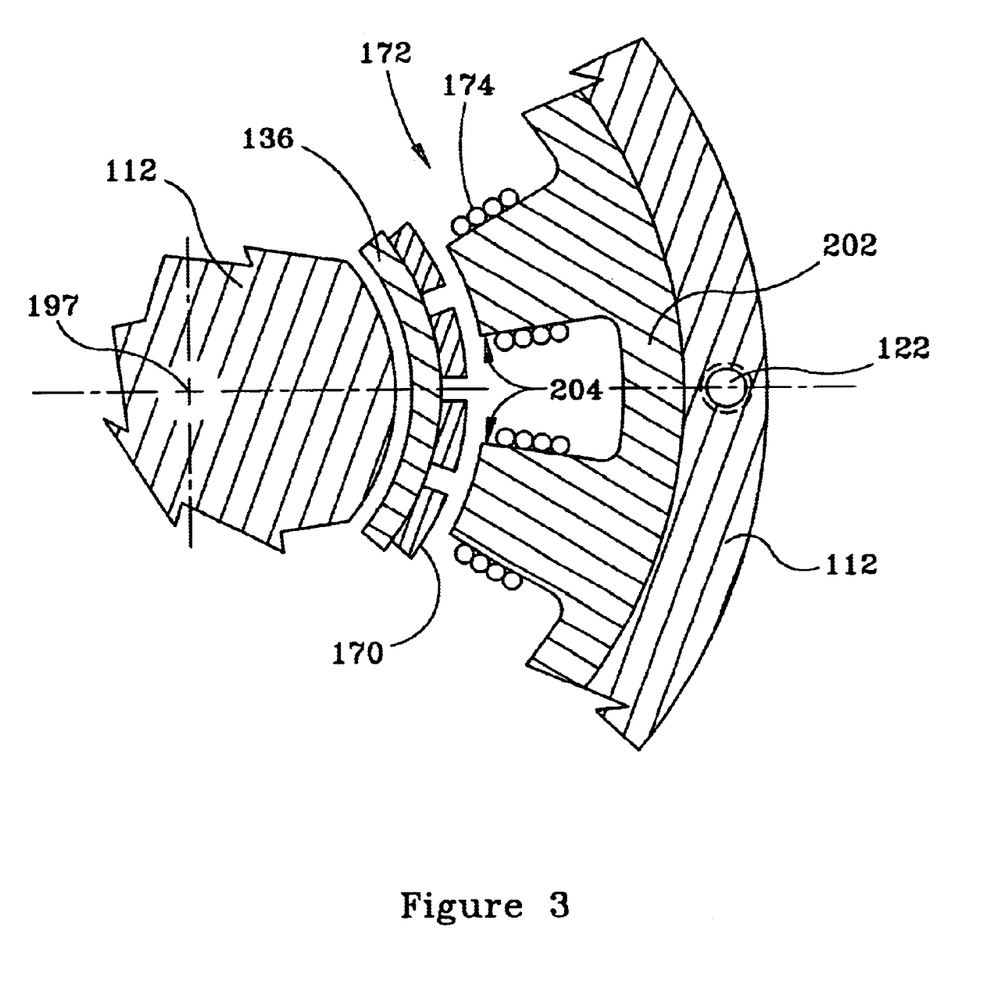
FIG. 3 is a partial sectional view of the hydrodynamic bearing spindle motor taken along section line 3—3 of FIG. 2.

The stator 138 is generally formed of a stack of stator laminations 172 and associated stator windings 174. The stator lamination 172 comprises an annular support member 202 and a plurality of teeth 204, two of which are depicted in the partial cross section of FIG. 3, that extend inward from the support member 202 toward a central axis 197. The plurality of phase windings 174 are wound on the stator teeth 204, respectively, for magnetic communication with the rotor (i.e., magnets 170 and hub 136). The phase windings 174 may have a number of winding configurations. Some examples of phase windings that may benefit from the invention are discussed in U.S. patent Ser. No. 08/469,643, entitled IRONLESS HYDRODYNAMIC SPINDLE MOTOR, filed Jun. 6, 1995 by Dunfield et al., and in U.S. patent Ser. No. 08/400,661, entitled HYDRODYNAMIC SPINDLE MOTOR HAVING DISTRIBUTED WINDINGS, filed Mar. 8, 1995 by Dunfield et al., both of which are commonly assigned and are hereby incorporated by reference in their entireties.

Returning to FIG. 2, the stator 138 is generally retained in the base 112 by fasteners, adhesives or other conventional methods. In the illustrated embodiment, the stator 138 is disposed in a pocket formed in the base 112. A tab 120 is fastened by a screw 122 to the base 112 and includes a portion that overlies the stator 138 thus retaining the stator 138 in the pocket of the base 112. The bearing 137 includes a radial working surface 146 and axial working surfaces 148 and 150. The shaft 134 includes fluid ports 154, 156 and 158 that supply hydrodynamic fluid 160 and assist in circulating the fluid along the working surfaces of the bearing. Generally, the hydrodynamic fluid 160 is comprised of air, light oil or other bearing lubricant.

The spindle motor 132 further includes a thrust plate 145 that forms axial working surfaces 148 and 150 of hydrodynamic bearing 137.

A counterplate 162 cooperates with the working surface 148 to provide axial stability for the hydrodynamic bearing and to position the hub 136 within the spindle motor 132. An o-ring 164 is provided between the counterplate 162 and the hub 136 to seal the hydrodynamic bearing 137. The o-ring 164 prevents hydrodynamic fluid 160 from escaping between the counterplate 162 and the hub 136. If an o-ring is not used then the counterplate may be laser welded to the hub in order to seal the hydrodynamic bearing. Examples of hydrodynamic bearings that may benefit from the invention are described in U.S. Pat. No. 5,993,066, issued Nov. 30, 1999 to Leuthold et al., U.S. Pat. No. 5,977,674, issued Nov. 2, 1999 to Leuthold et al. and U.S. Pat. No. 6,004,036, issued Dec. 21, 1999 to Kloeppel et al., all of which are hereby incorporated by reference in their entirety. The present invention is useful with this and other forms of hydrodynamic bearings and is not limited to use with this particular configuration.

In operation, the windings are energized, causing the hub to rotate. The centrifugal force of the rotor cause the hydrodynamic fluid 160 to flow out from the ports 154, 158 and 158 towards the thrust plate 145. Generally, grooves (not shown) disposed on the shaft 134 and/or thrust plate145 pump the hydrodynamic fluid 160 respectively between the working surfaces 148, 150 and the counterplate 162 and hub 136. The pumping action builds up multiple pressure zones along the bearing 137, maintaining a fluid film between the rotating ports and providing stiffness to the bearing 137.

In order to effectively pump and maintain the hydrodynamic fluid 160 in the desired locations within the bearing 137, gaps defined between the working surface 148 and the counterplate 162 and the working surface 150 and the hub 136 must be set at a tightly controlled distance. Typically, the distance or clearance of the gap is set between about 2 $\mu$m and about 50 $\mu$m, dependant on the motor size, hydrodynamic fluid used and operational speed. Design tolerance of the gap to ensure the desired performance is plus or minus 1 $\mu$m.

The present invention provides a method for accurately setting gaps of this magnitude without having to rely on costly close part tolerances and/or burdensome levels of quality assurance measures. Generally, the method comprises assembling the bearing so that substantially no gap exists between at least some of the rotating and non-rotating parts, then inducing creep to generate the gap at the proper magnitude that provides the desired motor performance.

Figure 4:
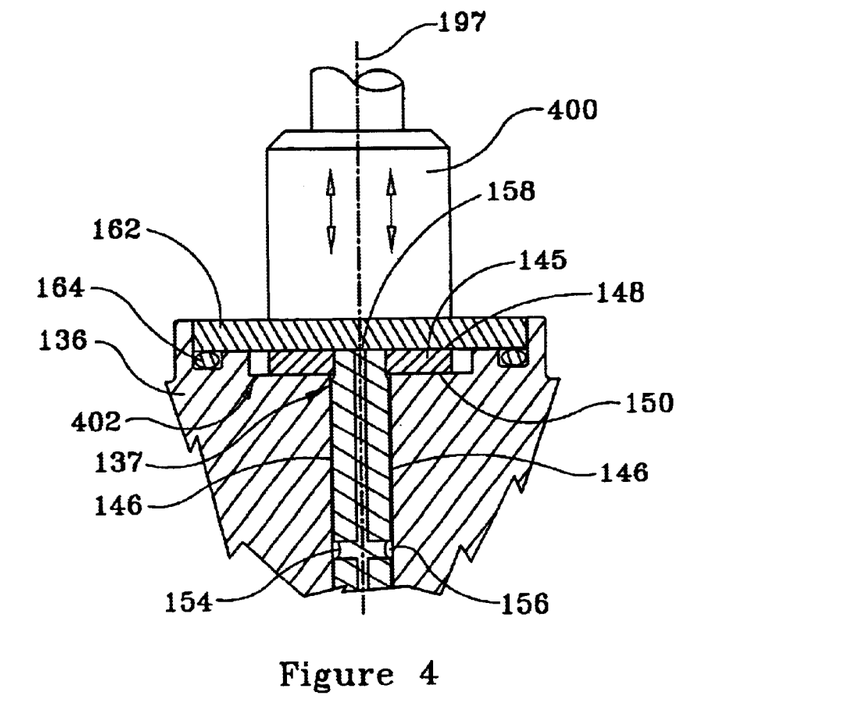
FIG. 4 is a partial sectional view of a hydrodynamic bearing having gaps set in accordance with the invention.
Figure 5:
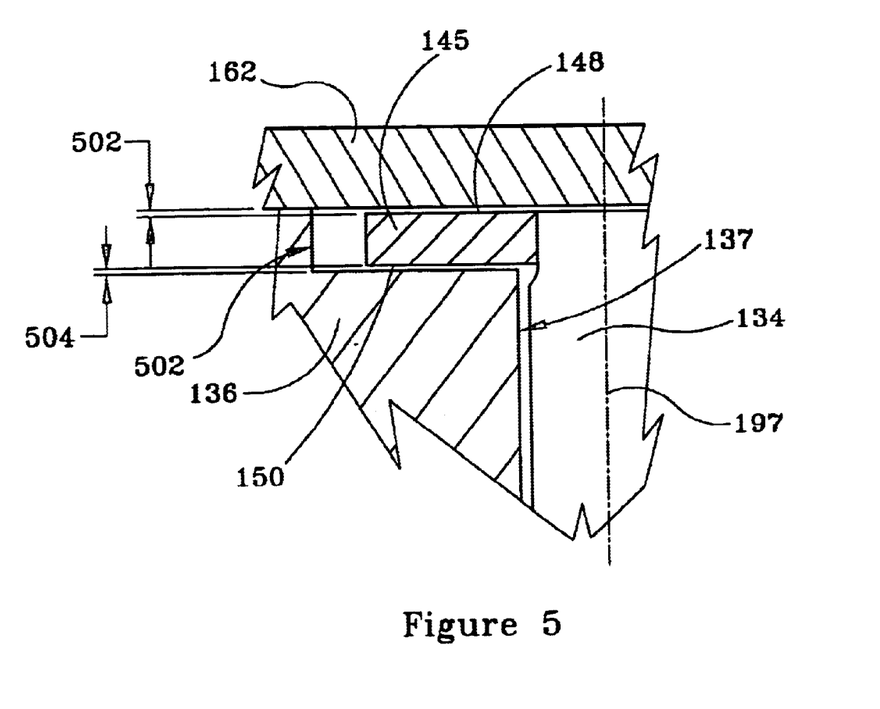
FIG. 5 is a partial sectional view of the hydrodynamic bearing of FIG. 4.

One embodiment of the inventive method is illustrated in FIGS. 4 and 5. Generally, the bearing 137 is assembled into the hub 136 and retained by the counterplate 162 as described above. The thrust plate 145 is configured to reside in a counterbore 402 so that the working surfaces 148, 150 of the thrust plate 145 respectively touch the counterplate 162 and the hub 136.

A creep inducing tool 400 is generally disposed against the counterplate 162. The tool 400 may be removably coupled to the counterplate 162 by adhesives, interlocking geometry, screws or other temporary fastening methods or devices. The tool 400 generally applies a creep inducing energy to the bearing 137. The applied energy stresses the bearing 137 causing the bearing 137 to permanently deform creating the gaps around the bearing 137 for the flow of the hydrodynamic fluid 160. In one embodiment, the creep inducing energy is in the form of an oscillating force applied to the counterplate 162 in an axial direction. The force is transferred to the thrust plate 145 and hub 136. The force may be applied by thermally cycling or applying acoustic (i.e., sonic) energy to the tool 400.

In one embodiment, the tool 400 is thermally cycled by heating and cooling the tool 400. The tool 400 may be heated and cooled between about −10 to about 150 degrees Celsius. The tool 400 may be heated and cooled at a rate of 5 to about 150 degrees Celsius per minute. Typically, after about 1 to about 10 heating and cooling cycles, the induced creep in the bearing 137 has established a gap 502 adjacent the working surface 148 and a gap 504 adjacent the working surface 150 (see FIG. 5). Preferably, the tool 400 is cycled between about −10 to about 150 degrees Celsius at a rate of 5 to about 150 degrees Celsius per minute for about 1 to about 10 cycles.

The gaps 502, 504 generally are set to about 2 to about 50 μm to ensure ample passage for the hydrodynamic fluid 160 while providing good bearing stiffness. Typically, the creep inducing energy, for example, the number of cycles, temperature range and rate of thermal change is chosen dependant upon the materials comprising the bearing 137, hub 136 and counterplate 162 along with the type of hydrodynamic fluid 160 utilized and the design speed of the motor 132. For a particular material combination, the amount of creep inducing energy required to set the gaps 502, 504 to a predetermined distance may be found empirically and is generally repeatable within a few microns.

After the gaps 502, 504 have been established, the tool 400 is removed. Although the tool 400 is depicted applying energy to the counterplate 162, the gaps 148, 150 may be created by disposing the tool 400 or similar devise in other surfaces of the spindle motor 132.

Figure 6:
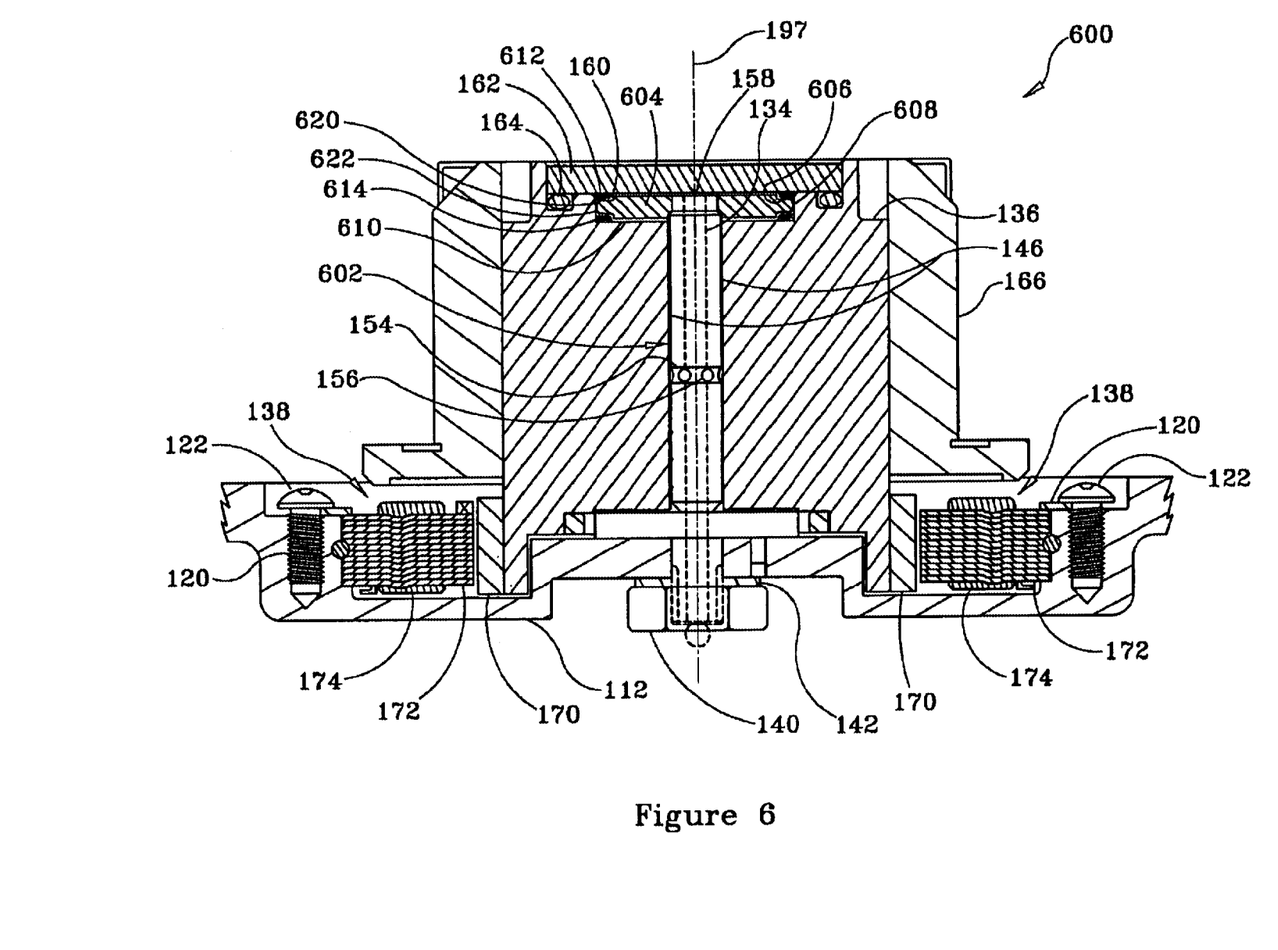
FIG. 6 is a sectional view of another embodiment of isolated hydrodynamic bearing spindle motor in accordance with the invention.

FIG. 6 depicts a hydrodynamic spindle motor 600 having a bearing 602 in which another method for inducing gaps may be practiced. Generally, the motor 600 is constructed similar to the motor 132 described with reference to FIGS. 2 and 3 above except that a thrust plate 604 of the bearing 602 rotates between a first guide ring 612 and a second guide ring 614.

Generally, the thrust plate 602 is disposed in a counterbore 610 formed in the hub 136. The second guide ring 614 is disposed in the counterbore 610 between the hub 136 and the thrust plate 602. The first guide ring 612 is disposed in the counterbore 610 between the thrust plate 602 and the counterplate 162. Generally, the guide rings 612 are press-fit into the counterbore 610 but may be alternatively coupled to the hub 136 by adhesives, retaining rings or other devices or methods.

The thrust plate 602 generally includes a first working surface 606 and a second working surface 608. The first working surface 606 and the first guide ring 612 generally have a gap 620 defined therebetween while the second working surface 608 and the second guide ring 612 have a gap 622 defined therebetween that allow the hydrodynamic fluid 160 to be pumped therethrough to lubricate and stabilize the bearing 602.

Figure 7:
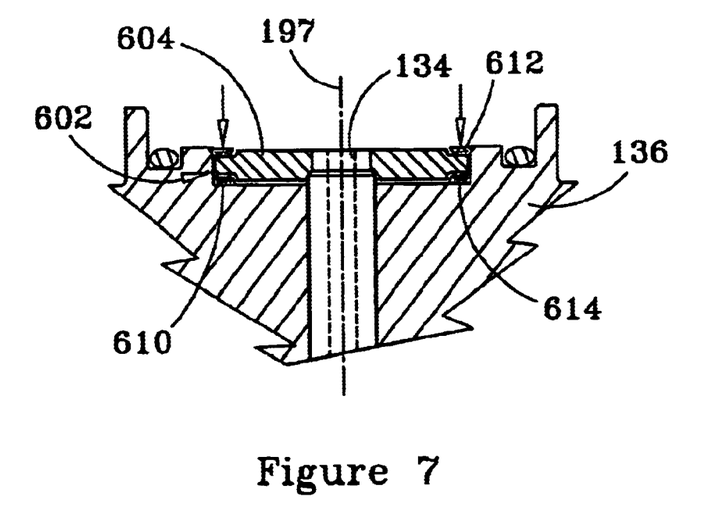
FIG. 7 is a partial sectional view of a hydrodynamic bearing having gaps set in accordance with the invention.

FIG. 7 depicts a partial sectional view of the bearing 602 of the hydrodynamic spindle motor 600 in a first stage of assembly. Generally, the second guide ring 614 is disposed in the counterbore 610. The thrust plate 604 is disposed against the second guide ring 614. The first guide ring 612 is then pressed against the thrust plate 604 such that substantially no gaps are present between the working surfaces 606, 608 and the guide rings 612, 614. Optionally, the thrust plate 604 may be configured to be substantially equal in diameter with the counterbore 610.

Figure 8:
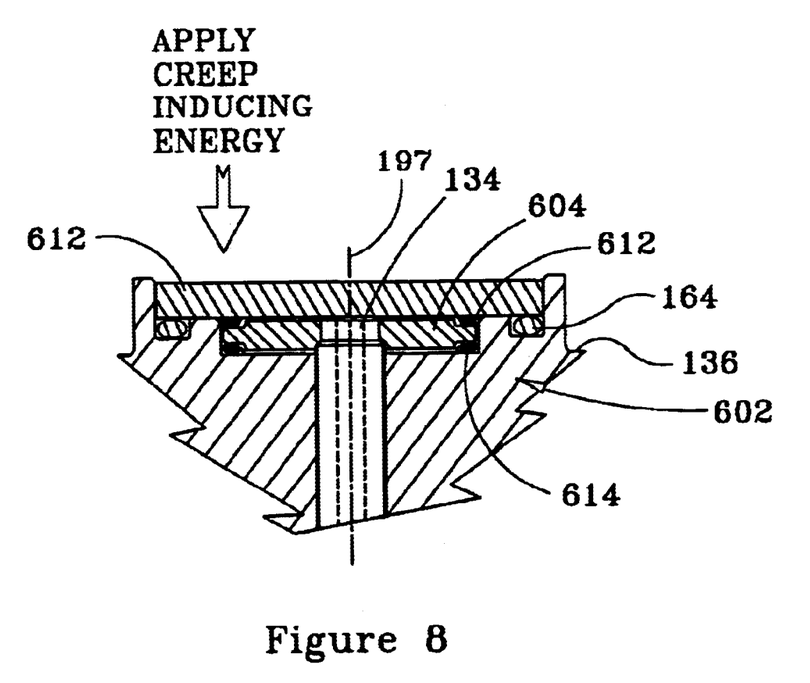
FIG. 8 is a partial sectional view of the hydrodynamic bearing of FIG. 7.

FIG. 8 depicts a partial sectional view of the bearing 602 of the hydrodynamic spindle motor 600 in a second stage of assembly. Generally, in the second stage of assembly after the thrust plate 604 has been set in a "no-gap" position relative to the guide rings 612, 614, the counterplate 162 is fastened to the hub 136 by conventional means such as press-fit, adhesives, clamping, fastening and the like. O-rings 164 are generally included between the counterplate 162 and hub 136 to retain the hydrodynamic fluid 160 within the bearing 602.

After the counterplate is fixed to the hub 136, creep inducing energy is applied to the bearing 602. The creep inducing energy generally causes the first guide ring 612 to move away from the second guide ring 614, thereby creating the gaps 620 and 622 between the thrust plate 604 and guide rings 612, 614. In configurations where the thrust plate 604 is the same diameter as the counterbore 610, creep may be induced therebetween to set an axial clearance 626 (see FIG. 3) between the thrust plate and hub 136.

In one embodiment, creep is induced by thermally cycling the bearing 137 about 1 to about 10 times. The bearing 137 is heated and cooled at a rate of about 5 to about 150 degrees Celsius per minute between about −10 to about 150 degrees Celsius. Preferably, the bearing 137 is heated and cooled at about 1 to about 10 times at a rate of about 5 to about 150 degrees Celsius per minute between about −10 to about 150 degrees Celsius to produce gaps 620 and 622 having combined width of about 1 to about 5 μm.

The thermal cycling is generally by cycling the parts in a temperature-controlled oven.

The inventive gap setting technique has several advantages. First, the invention allows hydrodynamic bearing gaps to be set without tight assembly tolerances which would typically necessitate burdensome qualify control procedures to confirm proper gap set and motor operation. For example, starting the gap set with the components disposed against one another eliminating the need for closely toleranced parts or precise assembly techniques to minimize tolerance stacks. Thus, the invention allows for the relaxation of tight component tolerances generally required in conventional designs resulting in lower component cost, robust assembly techniques and generally lower reject rates.

Although the invention has been described with reference to preferred embodiments, workers skilled in the art will recognize that changes may be made in form and detail without departing from the spirit and scope of the invention.

What is claimed is:

1. A method for setting one or more hydrodynamic bearing gaps between at least one working surface and a rotary member in a disc drive spindle motor, the method comprising:

disposing the rotary member against one or more working surfaces such that substantially no gap exists therebetween; and inducing creep between the rotary member and the working surfaces, the creep creating a bearing gap therebetween the rotary member and at least one of the working surfaces.

2. The method of claim 1, wherein the step of inducing creep further comprises:

cycling the rotary member and/or working surfaces through a temperature range.

3. The method of claim 2, wherein the step of cycling further comprises:

raising and lowering the temperature of the rotary member and/or working surfaces between a range of about −10 to about 150 degrees Celsius.

4. The method of claim 2, wherein the step of cycling further comprises:

raising and lowering the temperature of the rotary member and/or working surfaces about 1 to about 10 times.

5. The method of claim 1, wherein the step of inducing creep further comprises:

controlling a temperature gradient created in the rotary member and/or working surfaces.

6. The method of claim 5, wherein the step of controlling the temperature gradient further comprises:

creating a temperature gradient of about 5 to about 150 degrees Celsius/min in the rotary member and/or working surface.

7. The method of claim 1, wherein the step of inducing creep further comprises: creating a gap of about 1 to about 5 $\mu$m between the rotary member and at least one of the support surfaces.

8. The method of claim 1 wherein the step of disposing further comprises:

assembling a working surface of the rotary member between a thrust plate having at least one of the working surfaces.

9. The method of claim 1 wherein the step of disposing further comprises:

assembling a thrust plate of the rotary member between a first guide ring and a second guide ring, the thrust plate having one of the working surfaces facing each of the guide rings.

10. The method of claim 1 further comprising:

a lubricating oil disposed therebetween.

11. The method of claim 1, wherein the step of inducing creep further comprises:

applying energy to a tool coupled to the rotary member or a member that includes at least one of the working surfaces.

12. The method of claim 11, wherein the step of applying energy to the tool further generates an oscillating force.

13. The method of claim 11, wherein the step of applying energy to the tool further comprises:

thermally or sonically cycling the tool.

14. The method of claim 11, wherein the step of applying energy to the tool further comprises:

thermally cycling the tool between a temperature range of about −10 to about 150 degrees Celsius.

15. The method of claim 14, wherein the step of cycling further comprises:

raising and lowering the temperature of the rotary member and/or working surfaces about 1 to about 10 times.

16. The method of claim 11, wherein the step of applying energy to the tool creates a gap of about 1 to about 5 $\mu$m between the rotary member and at least one of the support surfaces.

17. The method of claim 16 further comprising:

removing the tool from the member after the gap is created.

18. A method for setting one or more hydrodynamic bearing gaps between at least one working surface and a rotary member in a disc drive spindle motor, the method comprising:

disposing the rotary member against one or more working surfaces such that substantially no gap exists therebetween; and thermally cycling the rotary member and/or the working surfaces to induce creep therebetween to create a bearing gap therebetween the rotary member and at least one of the working surfaces.

19. The method of claim 18, wherein the step of step of cycling further comprises:

raising and lowering the temperature of the rotary member and/or working surfaces between a range of about −10 to about 150 degrees Celsius at a rate of about 5 to about 150 degrees Celsius per minute.

20. A method for setting one or more hydrodynamic bearing gaps between at least one working surface and a rotary member in a disc drive spindle motor, the method comprising:

disposing the rotary member against one or more working surfaces such that substantially no gap exists therebetween; and cycling the rotary member and/or the working surfaces with a tool that produces an oscillating force co-axial with the rotary member to create a bearing gap therebetween the rotary member and at least one of working surfaces.

* * * * *